United States Patent [19]

Leimala

[11] 3,932,581

[45] Jan. 13, 1976

[54] METHOD OF SEPARATING COBALT (II) AND NICKEL (II) BY EXTRACTION

[75] Inventor: Raimo Juhani Leimala, Harjavalta, Finland

[73] Assignee: Outokumpu Oy, Outokumpu, Finland

[22] Filed: May 6, 1974

[21] Appl. No.: 467,096

[30] Foreign Application Priority Data
May 22, 1973 Finland................................. 1653/73

[52] U.S. Cl............................ 423/139; 75/101 BE
[51] Int. Cl.$^2$................... C01G 51/00; C01G 53/00
[58] Field of Search.......... 423/139; 75/101 BE, 119

[56] References Cited
UNITED STATES PATENTS

| | | | |
|---|---|---|---|
| 3,399,055 | 8/1968 | Ritcey et al............................. | 75/119 |
| 3,666,446 | 5/1972 | Cook et al............................... | 75/101 BE |

FOREIGN PATENTS OR APPLICATIONS 915,468   1/1963   United Kingdom................. 423/139

OTHER PUBLICATIONS

Tremillon, Bull. Soc. Chim., France 1958, pp. 502–511, as abstracted in Chem. Abstracts Vol. 52, No. 14280e,f.

*Primary Examiner*—Oscar R. Vertiz
*Assistant Examiner*—Brian E. Hearn
*Attorney, Agent, or Firm*—Brooks Haidt Haffner & Delahunty

[57] ABSTRACT

A method of separating cobalt (II) and nickel (II) by extraction with an organic extraction solution from an aqueous solution containing these metal ions is disclosed, in which a water soluble magnesium compound is added to the aqueous solution prior to the extraction and after the extraction the extraction agent is regenerated to recover the cobalt.

9 Claims, No Drawings

METHOD OF SEPARATING COBALT (II) AND NICKEL (II) BY EXTRACTION

BACKGROUND OF THE INVENTION

The present invention relates to a method of separating cobalt (II) and nickel (II) by extraction from water solutions containing these metallic ions.

So far, the number of methods for technological separation of cobalt and nickel by extraction is very limited. The best known methods are based on the ability of cobalt to form chloride complexes, whereby the cobalt can be extracted selectively from a strong chloride solution by means of anion-exchange type extraction reagents, such as amines. Since nickel does not form corresponding chloride complexes, the separation of cobalt and nickel is very sharp, but there is a disadvantage in the corrosion problems caused by strong chloride solutions and the change of environment required in most cases, i.e., from a sulphate solution into a chloride solution.

Another group of extraction processes is based on the use of ammonia complexes (e.g. U.S. Pat. Nos. 3,276,863; 3,380,801; and 3,438,768 and Finnish Patent Application No. 203/71. In some of these processes, the cobalt has been oxidized into a trivalent form, while in others the separation is carried out while both the metals are bivalent.

On the other hand, very little is known about the separation of cobalt and nickel from acid solutions. U.S. Pat. No. 3,336,133 describes the use of acid thiosulphates for the extraction of nickel from cobalt-bearing solutions, and Finnish Patent Application No. 1892/72 introduces an extraction process using an extraction agent mixture. U.S. Pat. No. 3,399,055 introduces a process for extracting cobalt from a nickel-bearing solution by means of an organic phosphoric acid.

The object of the present invention is to provide an improved separation of cobalt and nickel from each other from water solutions which contain both cobalt and nickel. The process according to the invention does not set any special requirement for the quality of the anion in the solution, but the extraction can take place from, for example, sulphate, nitrate, or carbonate solutions.

SUMMARY OF THE INVENTION

This invention is based on the observation that the presence of magnesium decisively improves the separation of cobalt and nickel, for example, when using an organic phosphoric acid within the pH range 4–7 as the extraction agent. This improvement in the separation is due to the fact that within this pH range the extraction properties of magnesium are between those of cobalt and nickel and thereby its presence causes a weakening of nickel extraction. Likewise, the presence of magnesium in the extraction facilitates the washing stage because, after nickel, magnesium is removed from the organic phase and, this being the case, the wash can be well carried out with a weak acid solution. The wash can also be carried out with either a cobalt or magnesium solution. The recovery of cobalt from the organic phase can be carried out by using generally known methods, e.g., by treating it with a mineral acid solution, preferably 1–3 N.

DESCRIPTION OF THE PREFERRED EMBODIMENTS

An extraction according to the invention is preferably carried out by the process according to my co-authored, commonly assigned U.S. patent application Ser. No. 362,731, but other extraction processes can also be used. It is essential, however, that the pH is kept within 4–7, preferably within 5–6, during the extraction, whereby the best possible extraction is obtained. It is also advantageous to carry out the washing stage, if it takes place with a cobalt or magnesium solution, within this pH range.

The extraction agent used in the process according to the formula

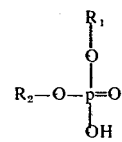

in which $R_1$ and $R_2$ are alkyl, aryl, or alkyl-aryl radicals, or one of them may be hydrogen. This extraction agent has been dissolved in an organic solvent; usually hydrocarbons or hydrocarbon mixtures, especially light petroleum, are used for this purpose. This organic solution can also contain additives, such as alcohols or tributhyl phosphate, which improve the properties of this solution. The extraction agent content of the solution is usually 5–30 percent by volume.

The water solution to which the extraction according to the invention is applied contains Co 0.1–50 g/l and Ni 0.1–100 g/l, and Mg at least 5 g/l. Prior to an extraction according to the present invention, all metals which are extracted at a lower pH than cobalt must be removed from the water solution. Such metals are above all iron, zinc, and copper. The removal of these metals can be carried out either by extracting them separately or by some other generally known method.

The extraction agent content of the extraction solution and the ratio between the volumes of the organic material and the aqueous solution in it are determined on the basis of the composition of the aqueous solution. The extraction temperature is 20°–80°C, preferably 50°–60°C.

The invention is described below in more detail with reference to the following examples:

EXAMPLE 1

A series of batch trials was carried out to study the effect of the magnesium content on the separation of cobalt and nickel. The initial solution contained Co 10 g/l, Ni 9 g/l, and Na 11 g/l, plus Mg 0–17 g/l. The extraction was performed with a 20-percent (by vol.) di-(2-ethyl-hexyl)phosphoric acid (abbreviation HDEHP), the volume ratio $V_{org}/V_{aq}$ being 1:1 and the contact period 10 minutes. The temperature was room temperature. During the extraction the pH was adjusted to the desired value by adding ammonia water. After the extraction the phases were allowed to separate and the metal contents of each phase were analyzed. The results, given in Table 1, clearly indicate the decisive importance of the magnesium addition for the improvement of the cobalt and nickel separation, which can be seen as a strong decrease of the extraction percentage of nickel ($E_{Ni}$). Expressed in terms of the separation coefficient $S_{Co,Ni}$, the separation at its best reached the value 56.

Separation coefficient $S_{Co,Ni} = \dfrac{D_{Co}}{D_{Ni}}$, in which $D_{Me} = \dfrac{[Me]_{org}}{[Me]_{aq}}$

Table 1

| Mg g/l | 0 | | 3.5 | | 8.5 | | 17.0 | |
|---|---|---|---|---|---|---|---|---|
| pH | $E_{Co}$ % | $E_{Ni}$ % | $E_{Co}$ % | $E_{Ni}$ % | $E_{Co}$ % | $E_{Ni}$ % | $E_{Co}$ % | $E_{Ni}$ % |
| 3.0 | 21.8 | 8.5 | 9.0 | 2.5 | 6.0 | 1.9 | 5.2 | 1.9 |
| 4.0 | 40.4 | 21.2 | 35.1 | 11.8 | 25.5 | 5.1 | 24.3 | 3.6 |
| 4.5 | 53.7 | 34.9 | 48.9 | 20.7 | 39.8 | 5.9 | 33.1 | 3.2 |
| 5.0 | 62.3 | 46.4 | 62.3 | 26.8 | 57.1 | 3.9 | 45.2 | 1.8 |
| 5.5 | 64.8 | 53.0 | 62.6 | 35.7 | 59.7 | 4.5 | 45.4 | 1.5 |
| 6.0 | 67.0 | 56.6 | 70.2 | 33.7 | 60.5 | 4.6 | 46.1 | 2.9 |
| 6.5 | | | | | 62.2 | 8.7 | 45.9 | 4.5 |
| 7.0 | | | | | 63.6 | 12.2 | 47.0 | 7.6 |

EXAMPLE 2

Washing trials were performed with two batches of organic phase, one of them containing Co 6.7 g/l, Ni 0.16 g/l, and Mg 3.9 g/l, and the other, Co 6.3 g/l, Ni 0.28 g/l, and Mg 3.6 g/l. The washing solution used was a weak sulphuric acid solution, magnesium sulphate solution, cobalt sulphate solution, or the original extraction solution, which contained Co 12 g/l, Ni 9 g/l, and Mg 9 g/l. All these solutions proved usable within certain concentration ranges. Too strong solutions do not prevent the separation of cobalt and nickel but cause too great a cobalt circulation between the extraction and regeneration stages. The results of the washing trials are given in Tables 2–4, which indicate that the sulphuric acid content of the washing solution should preferably be within 5–15 g/l. With magnesium sulphate solution, a magnesium concentration of about mg 10 g/l is suitable. Likewise, when using cobalt sulphate solution, a concentration of 10 g/l is suitable, when the pH of the washing solution is approximately the same as the pH used in the extraction. Too low a pH causes unnecessary regeneration of cobalt.

Table 2

| Use of sulphuric acid solution as washing solution | | | | |
|---|---|---|---|---|
| $H_2SO_4$ g/l | $\dfrac{V_{org}}{V_{aq}}$ | Co/Ni ratio in org. phase before wash | after wash | Co[x] % |
| 5 | 1 | 22.5 | 119 | 89 |
| 10 | 1 | 22.5 | 105 | 71 |
| 15 | 1 | 22.5 | 104 | 40 |
| 20 | 1 | 22.5 | 74 | 7 |
| 20 | 1 | 42 | 114 | 12 |

[x] Co = $\dfrac{[Co]_{org}}{[Co]_{tot}}$ at the washing stage

Table 3

| Use of magnesium sulphate solution as washing solution | | | | |
|---|---|---|---|---|
| $MgSO_4$ g Mg/l | pH | $\dfrac{V_{org}}{V_{aq}}$ | Co/Ni ratio in org. phase before wash | after wash | Co % |
| 10 | 4.5 | 1 | 42 | 450 | 55 |
| 10 | 5.5 | 1 | 42 | 475 | 67 |
| 10 | 5.5 | 2 | 22.5 | 145 | 84 |
| 10 | 5.5 | 3 | 22.5 | 150 | 89 |
| 20 | 5.5 | 1 | 42 | 290 | 35 |

Table 4

| Use of cobalt sulphate solution as washing solution | | | | | |
|---|---|---|---|---|---|
| $CoSO_4$ g Co/l | pH | $\dfrac{V_{org}}{V_{aq}}$ | Co/Ni ratio in org. phase before wash | after wash | Co % |
| 10 | 4.5 | 1 | 42 | 1710 | 67 |
| 10 | 5.5 | 1 | 42 | 1660 | 66 |
| 10 | 5.5 | 2 | 22.5 | 420 | 83 |
| 10 | 5.5 | 3 | 22.5 | 240 | 90 |
| 15 | 5.5 | 1 | 42 | 1080 | 56 |
| 12[x] | 5.5 | 1 | 42 | 980 | 44 |

[x] washing solution used was feed solution of extraction, Co 12 g/l, Ni 9 g/l, Mg 9 g/l

What is claimed is:

1. A method of separating cobalt (II) and nickel (II) by extraction, whereby an aqueous solution containing ions of these metals is mixed with an extraction agent containing an organic phosphoric acid and the pH during the extraction is kept within the range 4–7, after extraction the phases are separated from each other, and the extraction agent is regenerated to recover the cobalt, wherein at least 5 g/l of a water-soluble magnesium compound is added to the solution before the extraction.

2. A method according to claim 1, wherein, before the extraction agent is regenerated, it is washed with an aqueous solution which contains about 5–50 g/l Mg to wash away nickel which has been extracted along with the extraction agent.

3. A method according to claim 2 characterized in that the wash is carried out at pH 4.5–6.

4. A method according to claim 1, wherein the temperature is kept within the range 20°–80°C.

5. A method according to claim 1 wherein the amount of water-soluble magnesium compound added is 10–20 g/l.

6. A method according to claim 1 wherein the water-soluble magnesium compound is magnesium sulphate, magnesium nitrate, or magnesium carbonate.

7. A method according to claim 1 wherein the temperature is kept within the range 50°–60°C.

8. A method according to claim 1 wherein the organic phosphoric acid has the formula

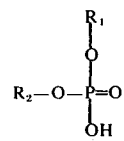

wherein $R_1$ and $R_2$ are selected from the group consisting of hydrogen, alkyl, aryl and alkyl-aryl and wherein not more than one of $R_1$ and $R_2$ is hydrogen.

9. A method according to claim 1 wherein the organic phosphoric acid is di-(2-ethyl-hexyl) phosphoric acid.

* * * * *